(12) United States Patent
Kelley et al.

(10) Patent No.: US 6,851,374 B1
(45) Date of Patent: Feb. 8, 2005

(54) DUAL STAGE INFLATOR FOR LOW MELTING GAS GENERANTS

(75) Inventors: Michael Eugene Kelley, Valrico, FL (US); Anthony J. Curtis, Palm Harbor, FL (US); Michael Felix Mulville, Bartow, FL (US); Dennis A. Trevillyan, Plant City, FL (US); Kevin Fitzgerald, Mesa, AZ (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/608,979

(22) Filed: Jun. 30, 2003

(51) Int. Cl.[7] ................................................. C06D 5/00
(52) U.S. Cl. ...................................... 102/530; 102/531
(58) Field of Search ............................... 102/530–531, 102/430; 280/736–737, 741

(56) References Cited

U.S. PATENT DOCUMENTS

| | | | | |
|---|---|---|---|---|
| 5,022,674 A | * | 6/1991 | Frantom et al. | 280/741 |
| 5,351,988 A | * | 10/1994 | Bishop et al. | 280/737 |
| 5,462,307 A | * | 10/1995 | Webber et al. | 280/737 |
| 5,660,412 A | * | 8/1997 | Renfroe et al. | 280/741 |
| 5,794,973 A | * | 8/1998 | O'Loughlin et al. | 102/531 |
| 6,196,583 B1 | * | 3/2001 | Ruckdeschel et al. | 280/736 |
| 6,474,685 B1 | * | 11/2002 | Meixner et al. | 280/736 |
| 6,481,357 B1 | * | 11/2002 | Lindner et al. | 102/530 |
| 6,601,872 B2 | * | 8/2003 | Zimbrich et al. | 280/741 |
| 6,616,183 B2 | * | 9/2003 | Huber et al. | 280/736 |

* cited by examiner

Primary Examiner—Michael Carone
Assistant Examiner—Lulit Semunegus
(74) Attorney, Agent, or Firm—Lonnie Drayer; Jarett Rieger

(57) ABSTRACT

A dual stage invention is designed to autoignite an autoignition material before a low temperature gas generant melts. Low temperature gas generants include a high nitrogen content organic fuel with ammonium nitrate as the oxidizer. The dual stage inflator has a first gas generant and a second gas generant that are ignited by separate igniters. The first gas generant and the second gas generant are insulated from the inflator housing to delay the heat transfer from the housing to the first gas generant and second gas generant during a bonfire test, which needs to be passed to receive Department of Transportation classification. The dual stage inflator also has an autoignition cartridge for disposing of the second gas generant by the first gas generant after the first gas generant burns for a predetermined amount of time.

15 Claims, 3 Drawing Sheets

DUAL STAGE INFLATOR FOR LOW MELTING GAS GENERANTS

FIELD OF THE INVENTION

The present invention relates to an inflator for providing inflation gas to fill an inflatable restraint cushion, and particularly relates to a dual stage inflator capable of tailoring inflation gas output based upon crash severity in addition to size and/or position of a vehicle occupant.

BACKGROUND OF THE INVENTION

Inflatable restraint cushions are commonly installed in motor vehicles to reduce the likelihood of the vehicle occupants sustaining injuries during vehicle crashes. Inflatable restraint cushions are commonly known as airbags in the safety restraint industry. During a vehicle crash, an airbag is rapidly filled with inflation gas between the vehicle occupant and the interior of the vehicle. The airbag absorbs the vehicle occupant's kinetic energy to provide a controlled, reduced deceleration of the vehicle occupant and to prevent the vehicle occupant from contacting the hard surfaces of the vehicle interior.

The source of inflation gas for an airbag is an inflator. An inflator may provide inflation gas in a number of manners such as through burning of pyrotechnic material (pyrotechnic inflator), through releasing stored gas (cold gas inflator), or through some combination thereof (hybrid inflator). Each of the above mentioned manners are well known in the art.

The pyrotechnic inflator typically includes an igniter, an enhancer (also known as a booster), and a gas generant. During the car crash, the igniter is fired, which ignites the enhancer, which in turn ignites the gas generant. The burning of the gas generant produces gaseous combustion products useful for inflating a vehicle airbag. Also well known in the art are dual stage pyrotechnic inflators, which have two combustion chambers. The dual stage inflators typically have two igniters for igniting gas generant in each of the two combustion chambers. The advantage of utilizing a dual stage inflator is its tailorability. There are numerous firing scenarios for a dual stage inflator such as, the firing of only the first stage, the firing of the first stage followed by a delayed firing of the second stage, and the firing of the first stage and second stage simultaneously.

The gas generant useful for a pyrotechnic inflator is a blend of a fuel and an oxidizer. The combustion of the fuel and oxidizer produces gaseous combustion products. Higher yield gas generants are desirable for a couple of reasons. First, higher yield gas generants require less gas generant to produce the same gas output as lower yield gas generants. Second, higher yield gas generants produce less solid particles or slag that need to be filtered. Organic compounds rich in nitrogen are typically selected for the fuel. Well-known oxidizers useful as oxidizers in gas generants are strontium nitrate and potassium nitrate. Another well-known oxidizer, ammonium nitrate, is desirable because the use of ammonium nitrate increases the gas yield of the gas generant because metal ions are not present in the oxidizer. Gas generants having a high nitrogen content organic molecule and ammonium nitrate have gas yields over 95%. As used herein, ammonium nitrate gas generant refers to a gas generant that contains a fuel and ammonium nitrate as the oxidizer.

The downside of using an ammonium nitrate gas generant is the low melting temperature of the eutectics or fuel/oxidizer mixture. The low temperature property of ammonium nitrate gas generants becomes a serious issue in obtaining shipping classification from the United States Department of Transportation. To obtain shipping approval, the inflator needs to maintain structural integrity or in other words should not fragment when an autoignition material in the inflator is induced by external heating (i.e. bonfire test). The autoignition material is a pyrotechnic mixture that spontaneously combusts or autoignites at a temperature before the gas generant undergoes a physical or chemical change such as decomposition, autoignition, or melting. Thus, in order for the autoignition material to function properly, the autoignition material needs to spontaneously ignite below a temperature that results in a chemical or physical change in the gas generant. Typically, in the industry the autoignition material needs to spontaneously ignite at a temperature above 130° C. If the autoignition material ignites after the gas generant undergoes a physical or chemical change, then the ballistic properties of the gas generant become unpredictable and the structural integrity of the inflator may fail.

As discussed earlier, ammonium nitrate is a highly desirable oxidizer for gas generants because this oxidizer increases the conversion rate of the gas generant to gaseous combustion products. Ammonium nitrate melts at about 169° C., and the addition of a fuel to the oxidizer may result in a eutectic that has a lower melting point. If the fuel is nitroguanidine or guanidine nitrate the resulting eutectic (fuel and oxidizer) has a melting point at about 135° C. If the fuel is 5-amino tetrazole, then the eutectic has a melting point as low as 115° C. Thus, a gas generant having ammonium nitrate and either nitroguanidine or guanidine nitrate has a melting point extremely close to 130° C., the lower autoignition temperature limit on the autoignition material. In order for the autoignition material to effectively deploy the gas generant, the autoignition material needs to be ignited before the gas generant melts. Accordingly, there is a desire to design an inflator that overcomes the potential melting of the ammonium nitrate gas generant before the ignition of the autoignition material.

SUMMARY OF THE INVENTION

A dual stage inflator in accordance with the present invention is designed to ignite an autoigntion material before a low temperature gas generant melts. The dual stage inflator contains a first gas generant and a second gas generant that generates inflation gas during a car crash. The burning of the first gas generant and the second gas generant produce gaseous combustion gases that flow out of the inflator into a folded airbag to inflate the airbag. The first gas generant and the second gas generant are surrounded by a housing, a first endcap, and a second endcap. The first endcap is secured to the housing on one end and the second endcap is secured to the housing on the other end.

An aspect of the invention is that the first gas generant is not in direct contact with the first endcap, the second endcap, or the housing. Moreover, the second gas generant is not in direct contact with the first endcap, the second endcap, or the housing.

Another aspect of the present invention is that the first autoigntion material is in intimate contact with the first igniter, and the firing of the first igniter ignites the first autoignition material. Likewise, the second autoignition material is in intimate contact with the second igniter, and the firing of the second igniter ignites the second autoignition material.

BRIEF DESCRIPTION OF THE DRAWINGS

With this summary of the invention, a detailed description follows with reference being made to the accompanying drawings which form part of the specification in which like parts are designated by the same reference numbers and of which.

DETAILED DESCRIPTION OF THE INVENTION

Figure 1:
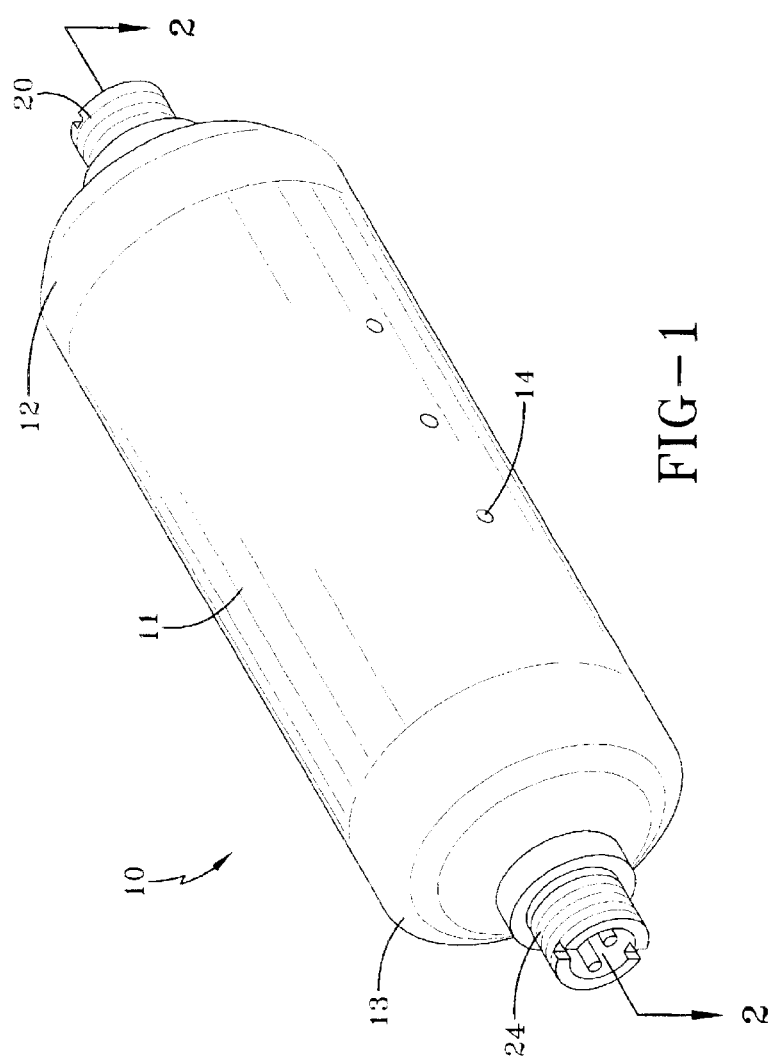
FIG. 1 shows a perspective view of the dual stage inflator in accordance with the present invention.

An inflator in accordance with the present invention is represented in FIG. 1. The inflator is a dual stage inflator 10 capable of providing multiple inflation rates for a vehicle airbag. The inflator 10 has a generally cylindrical shape having an elongated housing 11 with a first endcap 12 connected on one end of the housing 11 and a second endcap 13 connected on the other end of the housing 11. The housing 11 and the endcaps 12, 13 are made from a metallic material such as steel, low carbon steel, aluminum, a metal alloy, and the like. The endcaps are connected with the housing 11 by welding. The housing 11 contains a plurality of exit ports 14 arranged around the circumference thereof. The inflation gas is able to exit the inflator 10 via the exit ports 14 and travel into a folded airbag (not shown) to inflate the folded airbag. The exit ports 14 are arranged in a manner so that the inflator 10 is thrust neutral as inflation gas escapes the inflator 10. It is understood that the number and size of the exit ports 14 may vary without departing from the scope of the present invention. The exit ports 14 are covered by a burst foil tape 70. The burning of the first gas generant and the second gas generant produce inflation gas, which increases the internal pressure of the dual stage inflator 10. After the pressure reaches a predetermined level, the burst foil tape 70 ruptures creating a passageway for the infaltion gas to exit the dual stage inflator. It is contemplated that the burst foil tape 70 for each exit port may have different thickness so the burst foil tape 70 rupture as different internal pressures.

Figure 3:
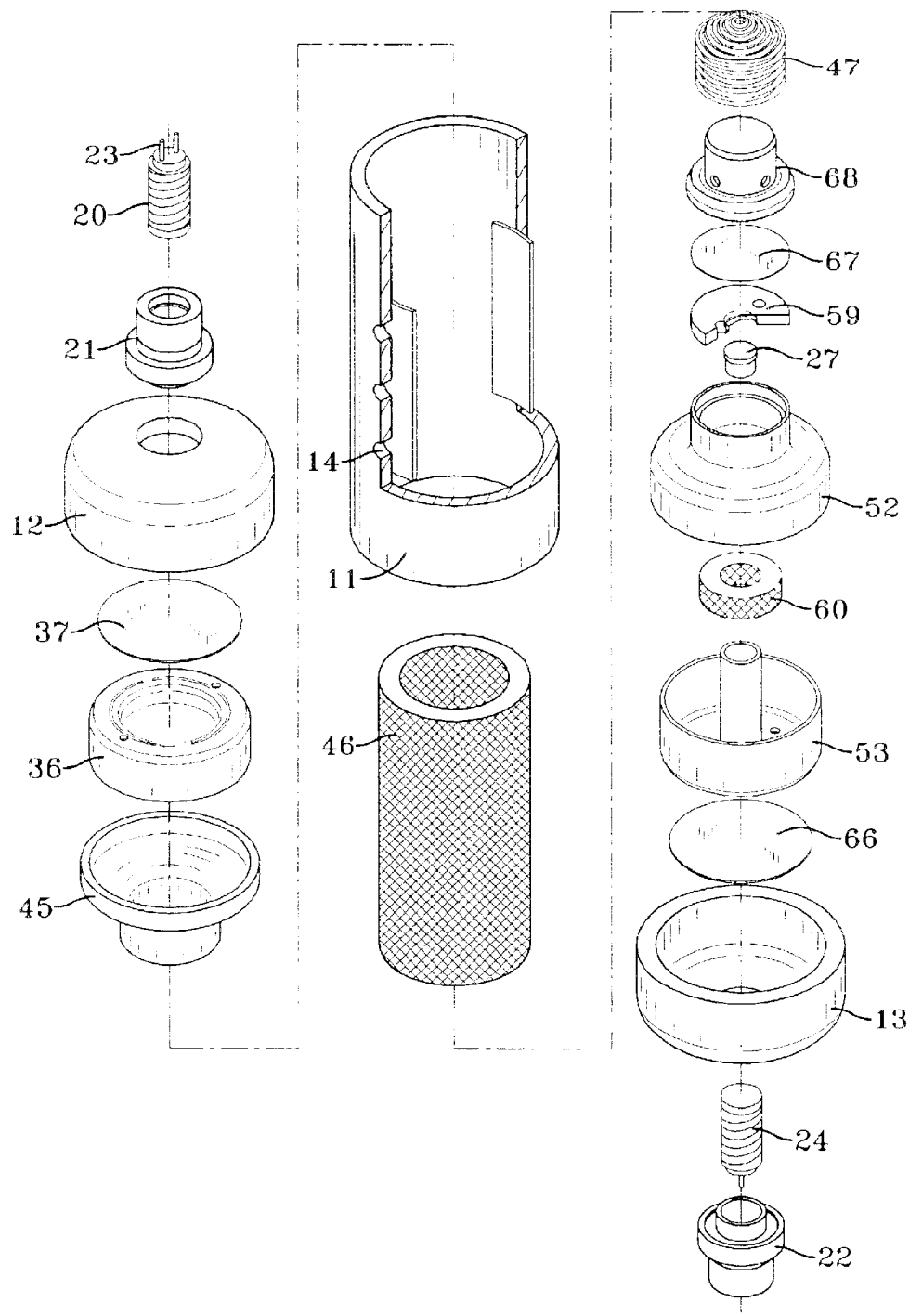
FIG. 3 shows an exploded view of the dual stage inflator in accordance with the present invention.

With reference to FIG. 3, the dual stage inflator 10 has two electrical igniters, a first igniter 20 and a second igniter 24, mounted on opposite ends of the inflator 10. The first igniter 20 and the second igniter 24 have the same physical components and operate in the same manner; however, the first igniter 20 might differ from the second igniter 24 in terms of the amount of ignition material loaded therein. The first electrical igniter has a pair of conducting electrodes 23 for mating with an electrical connector (not shown) of an electrical wire. The wire is a conduit of electrical signals transmitted from an electronic control unit. The electronic control unit processes signals from crash sensors and/or occupant position sensors. The electrodes 23 of the igniter are isolated from one another to prevent an electrical signal from flowing directly from one electrode to the other electrode. Typically, in an electrical igniter, the electrodes 23 are connected to one another via a bridge wire characterized by having a high amount of resistance. The bridge wire is embedded in multiple layers of ignition material. A well-known example of ignition material utilized in electrical igniters is zirconium potassium perchlorate. Due to the high amount of resistance associated with the bridge wire, as current passes along the bridge wire, heat is generated to ignite the ignition material. As mentioned earlier, the first igniter 20 is identical to the second igniter 24 except for the ignition material load. The first igniter 20 is utilized to ignite the first gas generant 42 in the first combustion chamber 50, while the second igniter 24 is utilized to ignite the second gas generant 49 in the second combustion chamber 65. In the present invention, the quantity of first gas generant 42 in the first combustion chamber 50 is greater than the quantity of second gas generant 49 in the second combustion chamber 65, and hence the ignition material load of the first igniter 20 needs to greater than the second igniter 24. It is contemplated that the ignition material loads for the first igniter 20 and the second igniter 24 may be equal.

The firing of the first igniter 20 ignites a first autoignition material 25. Alternatively, the first autoignition material 25 is also ignited when the first autoignition material 25 is exposed to a temperature equal to or greater than the autoignition temperature of the autoignition material. The first autoignition material 25 is a pyrotechnic mixture that upon burning produces hot combustion gaseous products. The burning of the first autoignition material 25 ruptures the first burst foil 37 and initiates the burning of the first enhancer 35. Autoignition materials are employed in airbag inflators to ensure that the airbag inflator functions in a safe manner at elevated temperatures. Melting or distortion of the gas generant can occur at elevated temperatures resulting in a perturbation of the surface area of the gas generant. The perturbation of the surface area of a gas generant can result in uncontrolled or undefined burning. The uncontrolled burning of the gas generant may lead to abnormally high internal pressure in the inflator, which may lead to inflator housing 11 failure. Therefore, autoignition materials are utilized in inflators to ignite the gas generant before an elevated temperature affects the ballistic properties of the gas generant.

The first autoignition material 25 is contained within a first cylinder 28 and is in intimate contact with the first igniter 20. The first cylinder 28 is attached to the first igniter 20 by pressure sensitive adhesive or other suitable means. The first cylinder 28 has two open ends. One end of the first cylinder 28 faces the first igniter 20 and the other open end faces the first enhaner. The open end of the first cylinder 28 that faces the first enhancer 35 has an annular lip to prevent the first autoignition material 25 from sliding out of the first cylinder 28. A first igniter holder 21 partially receives the first igniter 20 and the first cylinder 28; the first igniter holder 21 is secured to the first endcap 12 by welding, but it is appreciated that other securing techniques may be employed such as using threads.

The burning of the autoignition material ignites the first enhancer 35. The enhancer is spaced apart from the first autoignition material 25 and is a pyrotechnic material made from a mixture of a fuel and an oxidizer that rapidly burns at a hot temperature upon ignition. The first enhancer 35 is responsible for igniting the first gas generant 42.

The first enhancer 35 is stored within a recess 38 in the first enhancer retainer 36. A bottom portion 41 and a circular wall 51 of the first enhancer retainer 36 define the recess 38. The bottom portion 41 and the circular wall 51 do not contain any openings or holes. The first enhancer retainer 36 has an annular mounting portion 39 for securing the first enhancer retainer 36 to the inflator 10. The annular mounting portion 39 is substantially parallel with the circular wall of the first enhancer retainer 36 and the inflator housing 11. The first enhancer retainer 36 has a connecting portion 40 connecting the circular wall 51 to the annular mounting portion 39. The length of the bottom portion 41 is greater than twice the length of the connecting portion 40. The connecting portion 40 has a plurality of first enhancer retainer holes 48 therethrough; combustion gases from the burning of the first enhancer 35 flow through the first enhancer retainer holes 48 to reach the first combustion chamber to ignite the first gas generant. A first burst foil 37 is fixedly attached to the first enhancer retainer 36 in a manner that covers the recess 38 of the first enhancer retainer 36 and also covers the side of the connecting member facing the first igniter 20 including the first enhaner retainer holes. The first enhancer 35 is held in the recess 38 of the first enhaner retainer, which is covered by the first burst foil 37.

The first enhancer retainer 36 is press fit against a focuser 45, which is press fit against the inflator housing 11. The focuser 45 tapers inward in the direction toward the second endcap 13. The focuser 45 restricts the area in which the first gas generant 42 occupies. The first gas generant 42 is present in the first combustion chamber 50. The first combustion chamber 50 is defined by the space created by the first enhancer retainer 36, the focuser 45, a portion of the filter 46, and a spring 47. The spring 47 is employed for anti-abrasion and anti-rattling of the first gas generant 42. The spring 47 is made from a metallic material and biases the first gas generant 42 in the direction of the first endcap 12. The spring 47 is coiled in a spiral shape at the end towards the second endcap 13 and is coiled in a circular shape at the end facing the first endcap 12. Due to the circular shape of the spring 47 at the end facing the first endcap 12, the first gas generant 42 is prevented from being able to pass into the interior space of the spiral end of the spring 47. The first gas generant 42 is a pyrotechnic material comprising a fuel and an oxidizer that upon ignition produce combustion gaseous products for inflating an airbag.

The second gas generant 49 is ignited by the actuation of the second igniter 24. The second igniter 24 is inserted into the second igniter holder 22, and the second igniter holder 22 is welded to the second endcap 13. The second autoignition material 26 is contained in the second cylinder 29 and is in intimate contact with the second igniter 24. The second autoignition material 26 may be ignited by the actuation of the second igniter 24 or by the exposure to elevated external temperatures (i.e. bonfire test).

The burning of the second autoignition material 26 ignites the second enhancer 57. The second enhancer 57 is retained in the tubular portion 54 of the second enhancer retainer 53. The second enhancer retainer 53 has an annular securing portion 56 aligned parallel with the inflator housing 11, and an intermediary portion 55 coupling the tubular portion 54 to the securing portion 56. The intermediary portion 55 has a plurality of second enhancer retainer holes 61 therethrough; combustion gases from the burning of the second enhancer 57 flow through the second enhancer retainer holes 61 to reach the second combustion chamber 65 to ignite the second gas generant 49. A second burst foil 66 is attached to the second enhancer retainer 53 via a pressure sensitive adhesive whereby the end of the tubular portion 54 closest to the second igniter 24 and the second enhancer retainer holes 61 are covered. The second retainer is press fitted against the funnel 52. The funnel 52 tapers inward in the direction of the first endcap 12. The funnel 52 is press fitted against the inflator housing 11. The portion of the funnel 52 with the greatest radius contacts the inflator housing 11 while the securing portion 56 of the second enhancer retainer 53 contacts the funnel 52. The funnel 52 has a curvilinear shape whereby the portion of the funnel 52 in closer proximity to the first gas generant 42 has a smaller diameter than the portion of the funnel 52 press fit against the housing 11. There is no part of the second enhancer retainer 53 that directly contacts the inflator housing 11 or the second endcap 13.

A circular divider 59 and a diffuser cap 68 are arranged between the first gas generant 42 and the second gas generant 49. The divider 59 has a plurality of divider holes 58 therethrough, and the entire open end of the diffuser cap 68 is covered by a third burst foil 67. The third burst foil 67 is also attached to the divider 59 on the side of the divider 59 facing the first gas generant 42. The diffuser cap 68 has a plurality of diffuser cap apertures 69 therethrough arranged around the circumference thereof. The diffuser cap 68 has substantially the same diameter throughout. The open end of the diffuser cap 68 spreads radially outward for attachment to the funnel 52. The divider 59 and the diffuser cap 68 are fixedly attached to the funnel 52 via crimping. The spiral portion of the spring 47 coils around the diffuser cap 68.

The inflator 10 in accordance with the present invention includes an autoignition cartridge 27. The autoignition cartridge 27 is designed to be ignited from the heat created from the burning of the first gas generant 42. The heat is transferred to the divider 59, which transfers the heat to the autoignition cartridge 27. The autoignition cartridge 27 has pyrotechnic material that burns before the second gas generant 49 undergoes a physical or chemical change. The burning of the pyrotechnic material of the autoignition cartridge 27 ignites the second enhancer 57, which in turn ignites the second gas generant 49. Accordingly, the second gas generant 49 may be ignited by multiple mechanisms. First, the second gas generant 49 may be ignited by the ignition of the autoignition cartridge 27, which is triggered by the burning of the first gas generant 42. Second, the second gas generant 49 may be ignited by the actuation of the second igniter 24 by an electrical signal. Third, the second gas generant 49 may be ignited by the ignition of the second autoignition material 26 triggered by the elevation of the outside temperature of the inflator 10 over a predetermined temperature. The autoignition cartridge 27 is a safety feature incorporated in the present invention to ensure proper disposal of the second gas generant 49 in the inflator 10. The autoignition cartridge 27 is designed to ignite the second enhancer 57 before the second gas generant 49 melts, which would negatively impact its ballistic properties.

The second combustion chamber 65 is the region of the inflator 10 enclosed by the second enhancer retainer 53, the funnel 52, and the divider 59. The second gas generant 49 occupies the space in the second combustion chamber 65. A ceramic piece 60 or other suitable material may be employed in the second combustion chamber 65 for anti-abrasion and anti-rattling purposes for the second gas generant 49.

Figure 2:
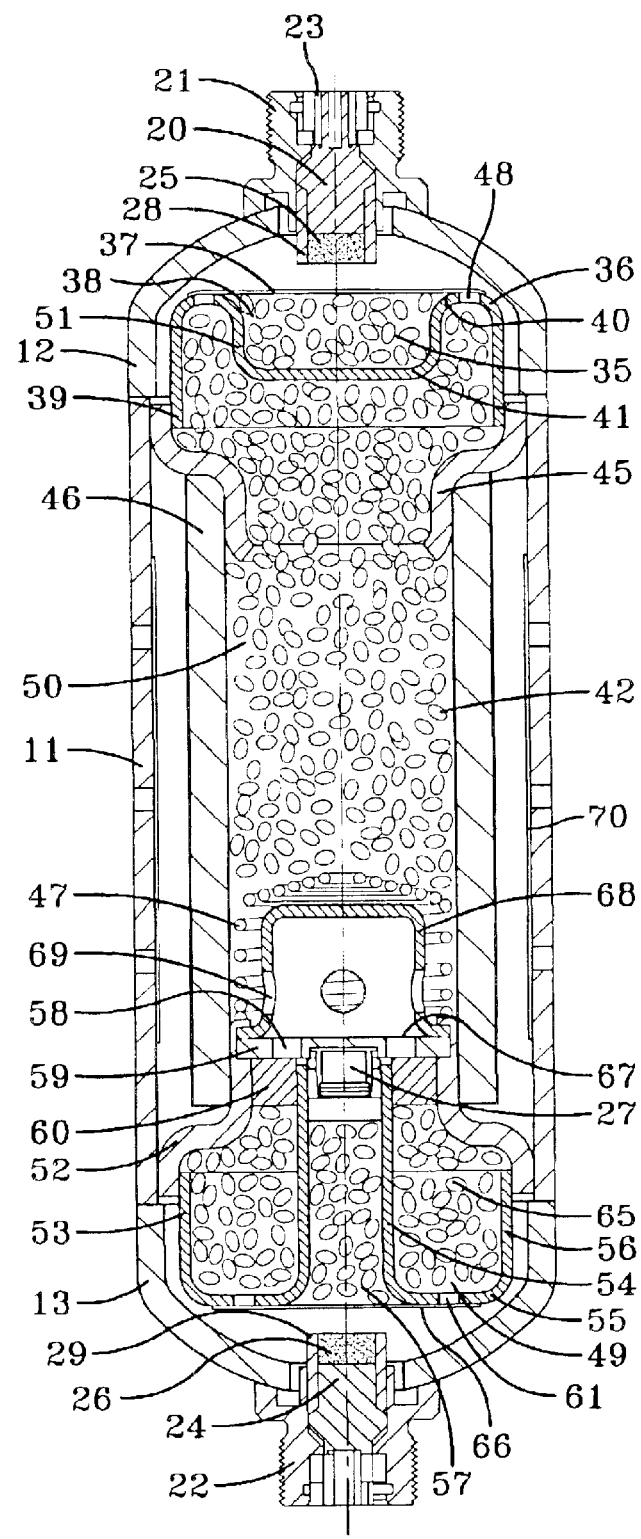
FIG. 2 shows a cross section view of the inflator in FIG. 1 along 2—2.

In the inflator 10 of the present invention, one filter 46 is included in the inflator 10 to filter 46 and cool the hot gases produced from the burning of the first gas generant 42 and the second gas generant 49. The filter 46 extends from the curved portion of the focuser 45 to the curved portion of the funnel 52 as seen in FIG. 2. As discussed above, the filter 46 contributes to defining the first combustion chamber 50, and thus a portion of the first gas generant 42 contacts the filter 46. The filter 46 has a generally cylindrical shape. A plenum or air gap exists between the filter 46 and inner surface of the housing 11 to prevent the filter 46 from clogging the exit ports 14 and to prevent the limited use of the filter 46 by the inflation gas. By providing an air gap, the combustion gases produced from the burning of the first gas generant 42 and the second gas generant 49 pass through the filter 46 into the air gap and subsequently through the exit ports 14.

Moreover, the plenum helps prevent the exit ports 14 from becoming partially blocked from the filter 46 while inflation gas departs the inflator 10. The filter 46 has a two-fold purpose; first, to act as a heat sink and cool the hot combustion gaseous products and second, to catch slag or solid particles.

The dual stage inflator 10 in the present invention employs a first autoignition material 25, a second autoignition material 26, and an autoignition cartridge 27. The first autoignition material 25 and the second autoignition material 26 may be the same autoignition composition as the autoignition composition found in the autoignition cartridge 27. A well-known autoignition composition in the industry is nitrocellulose, which autoignites at a temperature about 185° C. This autoignition material is suitable for many different gas generants; however, nitrocellulose is generally not suitable for ammonium nitrate gas generants. Ammonium nitrate gas generants with nitroguanidine or guanidine nitrate as the fuel have eutectic (fuel and oxidizer) melting point at about 135° C. In order for the autoignition to ignite before the ammonium nitrate gas generant melts, an autoignition composition having a lower autoignition temperature than nitrocellulose needs to be gas selected. The autoignition composition for the present invention may be selected from the autoigntion compositions taught in co-assigned patent application Ser. No. 10/104,359, which is incorporated by reference in its entirety. The preferred autoignition composition in this referenced patent application has nitroguanidine, antimony III sulfide, and silver I nitrate.

The first enhancer 35 and the second enhancer 57 may be made from the same pyrotechnic composition. The fuel for the first enhancer 35 and the second enhancer 57 is a high nitrogen content organic compound such as a tetrazole, triazole, nitroguanidine, guanidine nitrate, and the like. The oxidizer for the first enhancer 35 and the second enhancer 57 may be selected from one of more of the following: metal oxides, metal nitrates, metal chlorate, metal perchlorates, ammonium nitrate, and the like. The purpose of the first enhancer 35 and the second enhancer 57 is to rapidly ignite the first gas generant 42 and the second gas generant 49 respectively. The first enhancer 35 and the second enhancer 57 typically burn at a higher temperature than the first gas generant 42 and the second gas generant 49.

In accordance with the present invention, the first gas generant 42 and the second gas generant 49 is an ammonium nitrate gas generant. The fuel for the first gas generant 42 and the second gas generant 49 is selected from a high nitrogen content organic compound such as a tetrazole, amino tetrazole, triazole, nitroguanidine and the like. The oxidizer is ammonium nitrate. The present invention is not limited to only ammonium nitrate gas generants; other gas generants may be employed having similar melting properties as ammonium nitrate gas generants.

The first gas generant 42 and the second gas generant 49 are separated from direct contact with the first endcap 12, the second endcap 13, and the housing 11. The first enhancer retainer 36, the second enhancer retainer 53, the focuser 45, the funnel 52, and the filter 46 maintain a minimum distance from the first gas generant 42 and the second gas generant 49 with the first endcap 12, the second endcap 13, and the housing 11. The reason for incorporating the minimum distance is to delay the heat transfer from the housing 11 and the endcaps to the first and second gas generants 42, 49 during a bonfire test. Typically, in the industry the autoignition material needs to spontaneously ignite at a temperature above 130° C. Since ammonium nitrate gas generants with nitroguanidine or guandine nitrate melt at about 135° C., which is very similar to the autoignition temperature of the first and second autoignition materials, the first and second gas generants 42, 49 need to be insulated or isolated to prevent the first and second gas generants 42, 49 from melting before the autoignition of the first and second autoignition materials. Because of the minimum distance, as the outside temperature of the inflator 10 rises during a bonfire test, the first and second autoignition materials ignite before the first gas generant 42 and the second gas generant 49 melts.

In all cases it is understood that the above-described embodiments are merely illustrative of but a few of the many possible specific embodiments which represent the applications of the principles of the present invention. Numerous and varied other arrangements can be readily devised by those skilled in the art without departing from the spirit and scope of the invention.

We claim:

1. An inflator comprising:
    a housing connected on one end by a first endcap and connected on an opposite end by a second endcap;
    a first igniter having ignition material that burns upon actuation of the first igniter by an electrical signal, the first igniter being held at the first endcap;
    a first autoignition material being in intimate contact with the first igniter whereby the first autoignition material is ignited from the burning of the ignition material of the first igniter;
    a first gas generant for producing inflation gas for inflating an airbag, the first gas generant being separated from direct contact with the first endcap, the second endcap, and the housing;
    a first enhancer for igniting the first gas generant, wherein the burning of the first autoignition material ignites the first enhancer which then ignites the first gas generant; and
    a first enhancer retainer for retaining the first enhancer, the first enhancer retainer being spaced from direct contact with the first endcap, the enhancer retainer comprises an enhancer recess for holding the first enhancer, a connection portion and an annular mounting portion arranged substantially parallel with the first endcap, wherein the connection portion connects the enhancer recess to the mounting portion, the connection portion has a plurality of first enhancer retainer holes for passage of hot gas from first enhancer to the first gas generant, the plurality of first enhancer retainer holes and the enhancer recess being spaced from the first endcap and covered by a first burst foil located between the first enhancer retainer and the first endcap.

2. The inflator according to claim 1 further comprising a cylindrical filter encircling the first gas generant and a focuser for reducing the quantity of first gas generant in contact with an inner surface of the cylindrical filter.

3. The inflator according to claim 1 further comprising a second igniter and a second autoignition material, wherein burning of the second igniter ignites the second autoignition material.

4. The inflator according to claim 3 further comprising a second enhancer and a second gas generant, wherein the burning of the second autoignition material ignites the second enhancer, the burning of the second enhancer ignites the second gas generant.

5. The inflator according to claim 4 further comprising a second enhancer retainer comprising a tubular portion for receiving the second enhancer, the second enhancer retainer comprises an annular securing portion arranged substantially parallel with the second endcap.

6. The inflator according to claim 5 wherein the second enhancer retainer comprises an intermediary portion connecting the securing portion with the tubular portion, wherein the intermediary portion has a plurality of second enhancer retainer holes for providing a passageway for the hot gas from the second enhancer to reach the second gas generant.

7. An inflator comprising:
a housing connected on one end by a first endcap and on an opposite end by a second endcap;
a first enhancer for igniting a first gas generant, the first gas generant being separated from direct contact with the first endcap, the second endcap and the housing;
a second enhancer for igniting a second gas generant, the second gas generant being separated from direct contact with the first endcap, the second endcap and the housing;
a second enhancer retainer spaced form direct contact with the second endcap comprising a tubular portion for receiving the second enhancer, an annular securing portion arranged substantially parallel with the second endcap; and an intermediary portion connecting the securing portion with the tubular portion, wherein the intermediary portion has a plurality of second enhancer retainer holes for providing a passageway for the hot gas from the second enhancer to reach the second gas generant, the second enhancer retainer holes and the second enhancer retainer being spaced from the second endcap and covered by a second burst foil located between the second enhancer retainer and the second endcap; and,
an autoignition cartridge comprising pyrotechnic material that ignites at a temperature below the combustion temperature of the first gas generant whereby the burning of the first gas generant ignites the pyrotechnic material of the autoignition cartridge, the burning of the pyrotechnic material of the autoignition cartridge ignites the second enhancer which in turn ignites the second gas generant.

8. The inflator according to claim 7 wherein the second gas generant is in closer proximity to the second endcap than the second enhancer.

9. The inflator according to claim 8 further comprising a divider for separating the second gas generant and the second enhancer from the first gas generant, wherein the autoignition cartridge is situated between the divider on one side and the second enhancer on the other side.

10. The inflator according to claim 8 wherein further comprising a diffuser cap with diffuser cap apertures arranged around the circumference thereof, wherein hot gas from the burning of the second gas generant pass through the diffuser cap apertures and then through a filter, wherein the filter also filters hot gas from the burning of the first gas generant.

11. The inflator according to claim 8 further comprising a spring for reducing rattling of the first gas generant and for maintaining a predetermined distance between the diffuser cap and the first gas generant.

12. An inflator comprising:
a housing connected on one end by a first endcap and on an opposite end by a second endcap;
a first enhancer for igniting a first gas generant;
a second enhancer for igniting a second gas generant;
a second enhancer retainer spaced from direct contact with the second endcap comprising a tubular portion for receiving the second enhancer, an annular securing portion arranged substantially parallel with the second endcap; and an intermediary portion connecting the securing portion with the tubular portion, wherein the intermediary portion has a plurality of second enhancer retainer holes for providing a passageway for the hot gas from the second enhancer to reach the second gas generant;
an autoignition cartridge comprising pyrotechnic material that ignites at a temperature below the combustion temperature of the first gas generant whereby the burning of the first gas generant ignites the pyrotechnic material of the autoignition cartridge, the burning of the pyrotechnic material of the autoignition cartridge ignites the second enhancer which in turn ignites the second gas generant; and
an inflator wherein the second gas generant is in closer proximity to the second endcap than the second enhancer.

13. The inflator according to claim 12 further comprising a divider for separating the second gas generant and the second enhancer from the first gas generant, wherein the autoignition cartridge is situated between the divider on one side and the second enhancer on the other side.

14. The inflator according to claim 12 wherein further comprising a diffuser cap with diffuser apertures arranged around the circumference thereof, wherein hot gas from the burning of the second gas generant pass through the diffuser cap apertures and then through a filter, wherein the filter also filters hot gas from the burning of the first gas generant.

15. The inflator according to claim 12 further comprising a spring for reducing rattling of the first gas generant and for maintaining a predetermined distance between the diffuser cap and the first gas generant.

* * * * *